(12) United States Patent
Tadayon et al.

(10) Patent No.: US 6,976,009 B2
(45) Date of Patent: *Dec. 13, 2005

(54) METHOD AND APPARATUS FOR ASSIGNING CONSEQUENTIAL RIGHTS TO DOCUMENTS AND DOCUMENTS HAVING SUCH RIGHTS

(75) Inventors: Bijan Tadayon, Germantown, MD (US); Aram Nahidipour, Mill Creek, WA (US); Xin Wang, Los Angeles, CA (US); Michael C. Raley, Downey, CA (US); Guillermo Lao, Torrance, CA (US); Thanh T. Ta, Huntington Beach, CA (US); Charles P. Gilliam, Darien, CT (US)

(73) Assignee: ContentGuard Holdings, Inc., Wilmington, DE (US)

( * ) Notice: Subject to any disclaimer, the term of this patent is extended or adjusted under 35 U.S.C. 154(b) by 467 days.

This patent is subject to a terminal disclaimer.

(21) Appl. No.: 09/867,749

(22) Filed: May 31, 2001

(65) Prior Publication Data

US 2002/0184160 A1 Dec. 5, 2002

(51) Int. Cl.⁷ ............................................. G06F 17/60
(52) U.S. Cl. ............................. 705/51; 707/9; 707/104
(58) Field of Search ............................. 705/50–59, 18, 705/20–23, 26–27; 713/155–160, 164–177; 380/200–203, 380/230–231; 707/100–104, 9–10; 434/118, 434/365

(56) References Cited

U.S. PATENT DOCUMENTS

| | | |
|---|---|---|
| 3,263,158 A | 7/1966 | Janis |
| 3,609,697 A | 9/1971 | Blevins et al. |
| 3,790,700 A | 2/1974 | Callais et al. |
| 3,798,605 A | 3/1974 | Feistel |
| 4,159,468 A | 6/1979 | Barnes et al. |
| 4,220,991 A | 9/1980 | Hamano et al. |
| 4,278,837 A | 7/1981 | Best |
| 4,323,921 A | 4/1982 | Guillou |
| 4,442,486 A | 4/1984 | Mayer |
| 4,529,870 A | 7/1985 | Chaum |
| 4,558,176 A | 12/1985 | Arnold et al. |
| 4,593,376 A | 6/1986 | Volk |
| 4,614,861 A | 9/1986 | Pavlov et al. |
| 4,644,493 A | 2/1987 | Chandra et al. |
| 4,658,093 A | 4/1987 | Hellman |
| 4,713,753 A | 12/1987 | Beobert et al. |
| 4,817,140 A | 3/1989 | Chandra et al. |
| 4,827,508 A | 5/1989 | Shear |

(Continued)

FOREIGN PATENT DOCUMENTS

EP 0 084 441 7/1983

(Continued)

OTHER PUBLICATIONS

"Authentica Announces PageRecall for Sun Solaris; First Active Rights Management Solution for Sun Solaris that Lets Users Dynamically Control the Use of Sensitive Digital Information", Business Wire, Feb. 20, 2001.*

(Continued)

*Primary Examiner*—James P. Trammell
*Assistant Examiner*—Mary Cheung
(74) *Attorney, Agent, or Firm*—Marc S. Kaufman; NixonPeabody, LLP

(57) ABSTRACT

Through the use of digital rights management, one or more conditional or consequential rights can be associated with a document. The conditional or consequential rights are activated by one or more trigger events that allow or restrict access to one or more documents by one or more users.

25 Claims, 5 Drawing Sheets

U.S. PATENT DOCUMENTS

| | | | |
|---|---|---|---|
| 4,868,376 A | 9/1989 | Lessin et al. |
| 4,891,838 A | 1/1990 | Faber |
| 4,924,378 A | 5/1990 | Hershey et al. |
| 4,932,054 A | 6/1990 | Chou et al. |
| 4,937,863 A | 6/1990 | Robert et al. |
| 4,949,187 A | 8/1990 | Cohen |
| 4,953,209 A | 8/1990 | Ryder, Sr. et al. |
| 4,961,142 A | 10/1990 | Elliott et al. |
| 4,975,647 A | 12/1990 | Downer et al. |
| 4,977,594 A | 12/1990 | Shear |
| 4,999,806 A | 3/1991 | Chernow et al. |
| 5,010,571 A | 4/1991 | Katznelson |
| 5,014,234 A | 5/1991 | Edwards, Jr. |
| 5,023,907 A | 6/1991 | Johnson et al. |
| 5,047,928 A | 9/1991 | Wiedemer |
| 5,050,213 A | 9/1991 | Shear |
| 5,052,040 A | 9/1991 | Preston et al. |
| 5,058,164 A | 10/1991 | Elmer et al. |
| 5,103,476 A | 4/1992 | Waite et al. |
| 5,113,519 A | 5/1992 | Johnson et al. |
| 5,136,643 A | 8/1992 | Fischer |
| 5,138,712 A | 8/1992 | Corbin |
| 5,146,499 A | 9/1992 | Geffrotin |
| 5,148,481 A | 9/1992 | Abraham et al. |
| 5,159,182 A | 10/1992 | Eisele |
| 5,183,404 A | 2/1993 | Aldous et al. |
| 5,191,193 A | 3/1993 | Le Roux |
| 5,204,897 A | 4/1993 | Wyman |
| 5,222,134 A | 6/1993 | Waite et al. |
| 5,235,642 A | 8/1993 | Wobber et al. |
| 5,247,575 A | 9/1993 | Sprague et al. |
| 5,255,106 A | 10/1993 | Castro |
| 5,260,999 A | 11/1993 | Wyman |
| 5,263,157 A | 11/1993 | Janis |
| 5,263,158 A | 11/1993 | Janis |
| 5,276,444 A | 1/1994 | McNair |
| 5,276,735 A | 1/1994 | Boebert et al. |
| 5,291,596 A | 3/1994 | Mita |
| 5,301,231 A | 4/1994 | Abraham et al. |
| 5,311,591 A | 5/1994 | Fischer |
| 5,319,705 A | 6/1994 | Halter et al. |
| 5,337,357 A | 8/1994 | Chou et al. |
| 5,339,091 A | 8/1994 | Yamazaki et al. |
| 5,341,429 A | 8/1994 | Stringer et al. |
| 5,347,579 A | 9/1994 | Blandford |
| 5,381,526 A | 1/1995 | Ellson |
| 5,394,469 A | 2/1995 | Nagel et al. |
| 5,410,598 A | 4/1995 | Shear |
| 5,412,717 A | 5/1995 | Fischer |
| 5,428,606 A | 6/1995 | Moskowitz |
| 5,432,849 A | 7/1995 | Johnson et al. |
| 5,438,508 A | 8/1995 | Wyman |
| 5,444,779 A | 8/1995 | Daniele |
| 5,453,601 A | 9/1995 | Rosen |
| 5,455,953 A | 10/1995 | Russell |
| 5,457,746 A | 10/1995 | Dolphin |
| 5,473,687 A | 12/1995 | Lipscomb et al. |
| 5,473,692 A | 12/1995 | Davis |
| 5,499,298 A | 3/1996 | Narasimhalu et al. |
| 5,502,766 A | 3/1996 | Boebert et al. |
| 5,504,814 A | 4/1996 | Miyahara |
| 5,504,818 A | 4/1996 | Okano |
| 5,504,837 A | 4/1996 | Griffeth et al. |
| 5,509,070 A | 4/1996 | Schull |
| 5,530,235 A | 6/1996 | Stefik et al. |
| 5,532,920 A | 7/1996 | Hartrick et al. |
| 5,534,975 A | 7/1996 | Stefik et al. |
| 5,539,735 A | 7/1996 | Moskowitz |
| 5,563,946 A | 10/1996 | Cooper et al. |
| 5,568,552 A | 10/1996 | Davis |
| 5,621,797 A | 4/1997 | Rosen |
| 5,629,980 A | 5/1997 | Stefik et al. |
| 5,633,932 A | 5/1997 | Davis et al. |
| 5,634,012 A | 5/1997 | Stefik et al. |
| 5,638,443 A | 6/1997 | Stefik et al. |
| 5,649,013 A | 7/1997 | Stuckey et al. |
| 5,655,077 A | 8/1997 | Jones et al. |
| 5,708,717 A | 1/1998 | Alasia |
| 5,734,823 A | 3/1998 | Saigh et al. |
| 5,734,891 A | 3/1998 | Saigh |
| 5,737,413 A | 4/1998 | Akiyama et al. |
| 5,737,416 A | 4/1998 | Cooper et al. |
| 5,745,569 A | 4/1998 | Moskowitz et al. |
| 5,748,783 A | 5/1998 | Rhoads |
| 5,757,907 A | 5/1998 | Cooper et al. |
| 5,761,686 A | 6/1998 | Bloomberg |
| 5,765,152 A | 6/1998 | Erickson |
| 5,768,426 A | 6/1998 | Rhoads |
| 5,825,892 A | 10/1998 | Braudaway et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,940,504 A | 8/1999 | Griswold |
| 5,943,422 A | 8/1999 | Van Wie et al. |
| 5,949,876 A | 9/1999 | Ginter et al. |
| 5,982,891 A | 11/1999 | Ginter et al. |
| 5,999,949 A | 12/1999 | Crandall |
| 6,047,067 A | 4/2000 | Rosen |
| 6,112,181 A | 8/2000 | Shear et al. |
| 6,115,471 A | 9/2000 | Oki et al. |
| 6,135,646 A | 10/2000 | Kahn et al. |
| 6,138,119 A | 10/2000 | Hall et al. |
| 6,141,754 A | 10/2000 | Choy |
| 6,157,721 A | 12/2000 | Shear et al. |
| 6,185,683 B1 | 2/2001 | Ginter et al. |
| 6,226,618 B1 | 5/2001 | Downs et al. |
| 6,233,684 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,282,404 B1 | 8/2001 | Linton |
| 6,292,569 B1 | 9/2001 | Shear et al. |
| 6,301,660 B1 | 10/2001 | Benson |
| 6,327,652 B1 | 12/2001 | England et al. |
| 6,330,670 B1 | 12/2001 | England et al. |
| 6,345,256 B1 | 2/2002 | Milsted et al. |
| 6,363,488 B1 | 3/2002 | Ginter et al. |
| 6,389,402 B1 | 5/2002 | Ginter et al. |
| 6,408,336 B1 | 6/2002 | Schneider et al. |
| 6,522,769 B1 * | 2/2003 | Rhoads et al. ............ 382/100 |
| 6,599,324 B2 | 7/2003 | Saito et al. |

FOREIGN PATENT DOCUMENTS

| | | | |
|---|---|---|---|
| EP | 0 180 460 | 5/1986 |
| EP | 0 332 707 | 9/1989 |
| EP | 0 651 554 | 5/1995 |
| EP | 0 668 695 | 8/1995 |
| EP | 0 725 376 | 8/1996 |
| GB | 2 136 175 | 9/1984 |
| GB | 2 236 604 | 4/1991 |
| JP | 2000181868 A * | 6/2000 | ........... G06F 15/00 |
| WO | WO 92/20022 | 11/1992 |
| WO | WO 93/01550 | 1/1993 |
| WO | WO 99/49615 | 9/1999 |
| WO | WO 01/63528 | 8/2001 |

OTHER PUBLICATIONS

"Enigma Announces INSIGHT 4.1 Electronic Publish Software; Only Solution that Dynamically Modifies, Adds and Deletes CD-ROM and Customer-based Intranet Content", Business Wire, Aug. 27, 1998.*

"National Semiconductor and EPR Partner for Information Metering/Data Security Cards" Mar. 4, 1994, Press Release from Electronic Publishing Resources, Inc.

Weber, R., "Digital Rights Management Technology" Oct. 1995.

Flasche, U. et al., "Decentralized Processing of Documents", pp. 119-131, 1986, Comput. & Graphics, vol. 10, No. 2.

Mori, R. et al., "Superdistribution: The Concept and the Architecture", pp. 1133-1146, 1990, The Transactions of the IEICE, vol. E 73, No. 7, Tokyo, JP.

Weber, R., "Metering Technologies for Digital Intellectual Property", pp. 1-29, Oct. 1994, A Report to the International Federation of Reproduction Rights Organizations.

Clark, P.C. et al., "Bits: A Smartcard protected Operating System", pp. 66-70 and 94, Nov. 1994, Communications of the ACM, vol. 37, No. 11.

Ross, P.E., "Data Guard", pp. 101, Jun. 6, 1994, Forbes.

Saigh, W.K., "Knowledge is Sacred", 1992, Video Pocket/Page Reader Systems, Ltd.

Kahn, R.E., "Deposit, Registration and Recordation in an Electronic Copyright Management System", pp. 1-19, Aug. 1992, Corporation for National Research Initiatives, Virginia.

Hilts, P. et al., "Books While U Wait", pp. 48-50, Jan. 3, 1994, Publishers Weekly.

Strattner, A, "Cash Register on a Chip may Revolutionize Software Pricing and Distribution; Wave Systems Corp.", pp. 62, Apr. 1994, Computer Shopper, vol. 14, No. 4, ISSN 0886-0556.

O'Conner, M., "New Distribution Option for Electronic Publishers; iOpener Data Encryption and Metering System for CD-ROM use; Column", pp. 134, Mar. 1994, CD-ROM Professional, vol. 7, No. 2, ISSN: 1409-0833.

Willett, S., "Metered PCs: Is Your System Watching You? Wave System beta tests new technology", pp. 84, May 2, 1994, InfoWorld.

Linn, R., "Copyright and Information Services in the Context of the National Research and Education Network ", pp. 9-20, Jan. 1994, IMA Intellectual Property Project Proceedings, vol. 1, Issue 1.

Perrit, Jr., H., "Permission Headers and Contract Law", pp. 27-48, Jan. 1994, IMA Intellectual Property Project Proceedings, vol. 1, Issue 1.

Upthegrove, L., "Intellectual Property Header Descriptors: A Dynamic Approach", pp. 63-66, Jan. 1994, IMA Intellectual Property Proceedings, vol. 1, Issue 1.

Sirbu, M., "Internet Billing Service Design and prototype Implementation", pp. 67-80, Jan. 1994, IMA Intellectual Property Project Proceedings, vol. 1, Issue 1.

Simmel, S. et al., "Metering and Licensing of Resources: Kala's General Purpose Approach", pp. 81-110, Jan. 1994, IMA Intellectual Property Project Proceedings, vol. 1, Issue 1.

Kahn, R., "Deposit, Registration and Recordation in an Electronic Copyright Management System", pp. 111-120, Jan. 1994, IMA Intellectual Property Project Proceedings, vol. 1, Issue 1.

Tygar, J. et al., "Dyad: A System for Using Physically Secure Coprocessors", pp. 121-152, Jan. 1994, IMA Intellectual Property Project Proceedings, vol. 1, Issue 1.

Griswold, G., "A Method for Protecting Copyright on Networks", pp. 169-178, Jan. 1994, IMA Intellectual Property Project Proceedings, vol. 1, Issue 1.

Nelson, T., "A Publishing and Royalty Model for Networked Documents", pp. 257-259, Jan. 1994, IMA Intellectual Property Project Proceedings, vol. 1, Issue 1.

Robinson, E., "Redefining Mobile Computing", pp. 238-240, 247-248 and 252, Jul. 1993, PC Computing.

Abadi, M. et al., "Authentication and Delegation with Smart-cards", 1990, Research Report DEC Systems Research Center.

Mark Stefik, "Letting Loose the Light: Igniting Commerce in Electronic Publication", pp. 219-253, 1996, Internet Dreams: Archetypes, Myths, and Metaphors, IDSN 0-262-19373-6.

Mark Stefik, "Letting Loose the Light: Igniting Commerce in Electronic Publication", pp. 2-35, Feb. 8, 1995, Internet Dreams: Archetypes, Myths and Metaphors,.

International Search Report for PCT/US02/14447 dated Feb. 14, 2003 (1 page).

International Search Report dated May 28, 2004 (International Patent Application No. PCT/US03/39055).

* cited by examiner

METHOD AND APPARATUS FOR ASSIGNING CONSEQUENTIAL RIGHTS TO DOCUMENTS AND DOCUMENTS HAVING SUCH RIGHTS

RELATED APPLICATION DATA

This application is related to Applicants' patent applications entitled METHOD AND APPARATUS FOR TRANSFERRING USAGE RIGHTS AND DIGITAL WORK HAVING TRANSFERRABLE USAGE RIGHTS (U.S. application Ser. No. 09/867,746), METHOD AND APPARATUS FOR ESTABLISHING USAGE RIGHTS FOR DIGITAL CONTENT TO BE CREATED IN THE FUTURE (U.S application Ser. No. 09/867,747), DEMARCATED DIGITAL CONTENT AND METHOD FOR CREATING AND PROCESSING DEMARCATED DIGITAL WORKS (U.S application Ser. No. 09/867,754), METHOD AND APPARATUS FOR DYNAMICALLY ASSIGNING USAGE RIGHTS TO DIGITAL WORKS (U.S application Ser. No. 09/867,745), and METHOD AND APPARATUS FOR HIERARCHICAL ASSIGNMENT OF RIGHTS TO DOCUMENTS AND DOCUMENTS HAVING SUCH RIGHTS (U.S application Ser. No. 09/867,748), which are being filed concurrently herewith, and are incorporated herein by reference in their entirety.

BACKGROUND OF THE INVENTION

1. Field of the Invention

This invention relates to the assignment of rights to a document. In particular, this invention relates to the assignment of conditional or consequential rights to one or more documents, and the management of those documents.

2. Description of Related Art

Digital rights management (DRM) describes a process of attaching usage rights to a digital work, such as eContent, as well as managing and enforcing the same rights. In general, these digital works and eContent can include any type of content, such as music, books, multimedia presentations, eBooks, video information, or the like. In general, any information that is capable of being stored can be protected through the use of digital rights management. For example, a digital book could be accompanied by a license establishing conditions, such as viewing, printing, borrowing, or the like, governing the book's usage. These rights could then be controlled by, for example, an associated reader's software, and the allowable transactions, such as buying, printing, or the like, authorized by, for example, a clearinghouse.

One of the most important issues impeding the widespread distribution of digital works as documents via electronic means, such as the internet, is the lack of protection of intellectual property rights of content owners during the distribution, dissemination and use of those digital documents. Efforts to overcome this problem have been termed "intellectual property rights management" (IPRM), "digital property rights management" (DPRM), "intellectual property management" (IPM), "rights management" (RM) and "electronic copyright management" (ECM), which can be collectively referred to as Digital Rights Management (DRM). There are a number of issues in Digital Rights Management including authentication, authorization, accounting, payment and financial clearing, rights specifications, rights verification, rights enforcement, document protection, and the like.

In the world of printed documents, a work created by an author is typically provided to a publisher, which formats and prints numerous copies of the work. The copies are then distributed to bookstores or other retail outlets, from which the copies are purchased by end users. While the low quality of physical copying, and the high cost of distributing printed material have served as deterrents to unauthorized copying of most printed documents, digital documents allow easy copying, modification, and redistribution if they are unprotected. Accordingly, digital rights management allows the protecting of digital documents to, for example, complicate copying, modifying and redistributing.

Similarly, it has been widely recognized that it is difficult to prevent, or even deter, individuals from making unauthorized distributions of electronic documents within current general-purpose computer and communication systems such as personal computers, workstations, and other devices connected via a distributed network, such as a local area network, an intranet and the internet. Many attempts to provide hardware-based solutions to prevent unauthorized copying have proven to be unsuccessful. Furthermore, the proliferation of broadband communications technologies and the development of the "national information infrastructure" (NII) will likely make it even more convenient to distribute large documents electronically, thus removing most deterrents to any unauthorized distribution of documents. Therefore, digital rights management technologies provide one method of protecting digital documents distributed electronically.

Two basic schemes have been employed to attempt to solve the document protection problem. In particular, the two basic schemes are secure containers and trusted systems. A secure container, or simply an encrypted document, offers one method of keeping document contents encrypted until a set of authorization parameters are satisfied. After the various parameters are verified, for example, by the document provider, the document can be released to a user. Commercial products such as IBM's Cryptolopes® and InterTrusts Digiboxes® fall into this category. While the secure container approach provides a solution to protect the document during delivery over unsecure channels, it does not provide any mechanism to prevent legitimate users from obtaining the unencrypted document, and then, for example, using and redistributing the unprotected document without authorization.

In the trusted system approach, the entire system that handles, for example, the distribution and viewing of a document, is responsible for preventing unauthorized use. Building such a trusted system usually entails introducing new hardware such as a secure processor, a secure storage, and secure rendering devices. The trusted system also requires that all software applications that run on the system be certificate to be trusted.

U.S. Pat. Nos. 5,530,235, 5,634,012, 5,715,403, 5,638,443 and 5,629,980, which are incorporated herein by reference in their entirety, generally discuss digital rights management. In general, an author creates a document and forwards it to a distributor for distribution. Typically, the author is the creator of the content, however, the author can be any one of the creator, the owner, the editor, or any other entity controlling a portion of content, or an agent of one of those entities. The author may distribute documents directly, without involving a secondary party such as a distributor. Therefore, the author and the distributor may be the same entity. A distributor can distribute documents to one or more users, for example, upon request. In a typical electronic distribution model, the content can be distributed as a document in encrypted form. For example, a distributor can encrypt the content with a random key, having encrypted the random key with a public key corresponding to one or more users. Thus, the encrypted document can be customized solely for a particular user. The user is then able to use the private key to unencrypt the public key and use the public key to unencrypt and view the document.

Payment for the document can be passed from a user to a distributor by way of a clearinghouse which can collect requests from one or more users who wish to view a particular document. The clearinghouse can also collect payment information, such as debit transactions, credit transactions, credit card transactions, or other known electronic payment schemes and forward the collected payments to a distributor. Furthermore, the clearinghouse may retain a share of the payment as a fee for these services. The distributor may also retain a portion of the payment from the clearinghouse to cover, for example, distribution services and royalties due an author.

Each time the user requests a document, an accounting message can be sent to an accounting server that can, for example, ensure that each request by the user matches a document sent by the distributor. Additionally, the accounting information can be received by an accounting server and distributor to reconcile any inconsistencies.

SUMMARY OF THE INVENTION

Conditional or consequential rights associated with a document allow for the limited usage of content based on, for example, an absolute value, a relative value, or the like. For example, the starting period of a right based on another event or another right can trigger the availability or expiration of availability of a document. Furthermore, the time for limiting the usage of content can be expressed as an absolute value, such as a particular time and date, or a relative value, such as a usage right expiring two minutes after a first usage. The usage right can also be linked to other events, such as the expiration of a right of another document, or the like. For example, a piece of music could be listened to for only one minute, or it can be listened to only once, after the right to a second piece of music has expired. This conditional or consequential right assignment can be hierarchical, such as the systems and methods described in co-pending U.S. application Ser. No. 09/867,748, entitled "Method and Apparatus for Hierarchical Assignment of Rights to Documents and Documents Having Such Rights," filed herewith and incorporated by reference in its entirety, and/or linked to other events that may or may not have more than one step or condition. For example, the condition could be a chain of events that trigger the conditional or consequential rights. An example of this can be used in remote learning schemes. For example, if college courses are offered on the internet, the courses can be offered at a specified time, or the access to a second course restricted until a first course has been viewed.

In another example, if an exam has five sections, and for each section, a thirty-minute period is allocated, the user can proceed to the next section by using the thirty allocated minutes, or by pushing a button on, for example, a user interface, which indicates that they have completed that section. Alternatively, other triggering events and/or conditions can also govern transition to a subsequent document based on, for example, a fifteen-minute break allocated between sections 3 and 4. In this exemplary embodiment, multiple timers or counters can keep track of the time for each section and/or for all of the sections combined.

Alternative, the test taker could switch back and fourth between different sections, as long as the time is within the allocated time for each section or within other thresholds, such as a fifty-minute maximum for any given section. Alternatively, in another exemplary embodiment, alternating between sections may be forbidden. In this exemplary embodiment, time allocations can be based on multiple rules, and counters may or may not be dependent on each other, as a test administrator sets the rules and constraints of the exam prior to administration of the exam.

This concept can include the concept of subsidiary rights, for which one grants a right to a user, provided the user satisfies some condition or performs an action. For example, a user can edit one a copy is made of a document.

As another example, for joint projects, more than one person may contribute to the document with comments and modifications and/or design changes in which case a digital rights management system can keep track of, exercised rights, modifications, sources of modifications, dates, order of changes, approvals, vetoes, priorities, or the like. For example, in a paperless office, three approvals from three different departments may be needed for an action item.

The right assignment can also be integrated into, for example, an e-mail or electronic messaging system. For example, a content owner can assign different rights to different individuals and share or limit rights to information or files based on those rights. A friend could request permission to view or use a particular file, or further distribute the file to another individual, everyone in the address book or the public as a whole. Alternatively, the rights could, for example, limit the extent to which a user can add or delete individuals from a mailing list or address book. The right to view people in an address book could also be restricted based on a usage right. As another example, while in an instant messaging mode, a user can have the right to exclude or limit other users to particular content.

If the set of assigned rights are commonly used for different documents, the rules can be expressed as, for example, templates such as those discussed in U.S. Provisional Application Ser. No. 60/261,753, entitled "Method and Apparatus for Editing and Specifying the Rights and Conditions Associated with Documents or digital contents," incorporated herein by reference in its entirety, multi-hyphen purpose templates, or the like. In general, a template can be used whenever a user desires to assign a predetermined set of rights to one or more, such as a set, of additional users. This template can contain, for example, a set of usage rights that may be particularly tailored towards the user class, accounting instructions, or the like.

In another exemplary embodiment, assume a content owner desires to assign some rights to a user, in terms of what compression methods the user can employ on the original data. For example, for some data, the content owner may wish to let the user be able to compress the data only by one of the choices of lossless compression techniques to maintain the integrity of the data. Alternatively, in another situation, for specific data the content owner may desire to let the user compress the data only by one of the choices of lossy methods, as long as the bit rate or total size of the document stays below a threshold.

For multilevel databases, some parts of the data may be open to public, while other parts may require different levels of rights or security clearance, such as differentiated security, using attribute-level sensitivity. For example, in a company, the telephone number of the employees may be accessible to the other employees, while other personal information, such as personnel information, cannot be accessed unless the content user is within a predefined class. For example, the direct supervisor may have access to inspect, read or modify the employee's personnel file, as long as a "paper trail" which records information pertaining to the supervisor's changes is generated and associated with the file. Furthermore, the right to notarize particular content, such as the electronic-signature of an authorized entity and/or a time stamp, with the option of an encryption for safe storage, can also be granted separately by a content owner.

Aspects of the present invention relate to assigning rights to documents. In particular, rights based on conditional or consequential conditions can be associated with a document.

Additionally, aspects of the present invention relate to a system for assigning conditional or consequential rights to one or more documents.

Furthermore, aspects of the present invention relate to activating or restricting access to one or more documents based on a conditional or consequential right associated with that document.

These and other features and advantages of this invention are described in, or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Typically, rights are assigned to one or more documents based on, for example, a license agreement with the content owner. These rights are generally static and can be exercised by a user at any time provided the conditions of the license agreement, such as payment, are satisfied. By modifying the management of these rights, an exemplary embodiment of the systems and methods of this invention allow for specific portions of the rights associated with a specific portion of a document to be triggered based on, for example, a conditional or consequential event.

For example, a document can have one or more rights associated with it which may include one or more usage rights and/or delegation rights. The usage rights specify, for example, the right a particular user has to the document such as viewing, editing, modifying, updating, printing, or the like. The delegation rights include, for example, to how many users a user can distribute the document to, and which rights the user is allowed to associate with those distributed documents.

Thus, by associating a conditional or consequential trigger with the one or more usage rights and delegation rights, a content owner can provide additional specificity governing the use of one or more documents.

Figure 1:
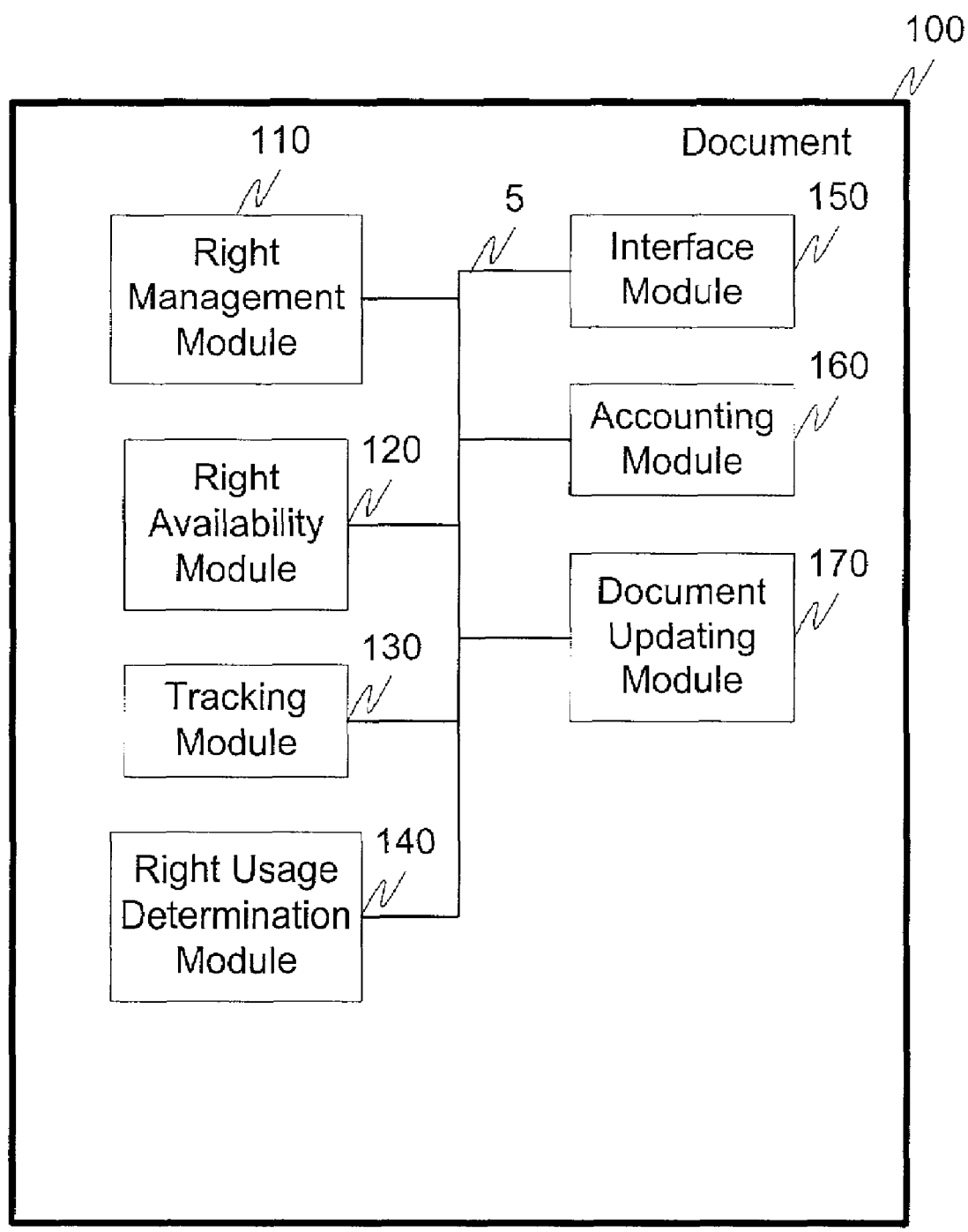
FIG. 1 is a functional block diagram illustrating an exemplary document according to this invention.

FIG. 1 illustrates an exemplary document 100. The document 100 comprises a right management module 110, a right availability module 120, a tracking module 130, a right usage determination module 140, an interface module 150, an accounting module 160, and a document updating module 170, interconnected by link 5. The document 100 can also be connected to a distributed network (not shown) which may or may not also be connected to one or more other documents, account processing systems, rights management systems, or other distributed networks, as well as one or more input devices and display devices (not shown).

While the exemplary embodiment illustrated in FIG. 1 shows the document 100 and associated components collocated, it is to be appreciated that the various components of the document 100 can be located at distant portions of a distributed network, such as a local area network, a wide area network, an intranet and/or the Internet, or within a dedicated document or document system. Thus, it should be appreciated that the components of the document 100 can be combined into one device or collocated on a particular note of distributed network. Furthermore, it should be appreciated that for ease of illustration, the various functional components of the document 100 have been divided as illustrated in FIG. 1. However, any of the functional components illustrated in FIG. 1 can be combined or further partitioned without affecting the operation of the system. As will be appreciated from the following description, and for reasons of computation efficiency, the components of the document can be arranged at any location within a distributed network without effecting the operation of the system. Furthermore, it is to be appreciated that the term module as used herein includes any hardware and/or software that provide the functionality as discussed herein. Likewise, the document 100 can comprise any necessary controllers, memory, and/or I/O interfaces that may be necessary given the particular embodiment and/or implementation of the document 100. Additionally, the document 100 can be any information to which conditional and/or consequential rights are associated.

Furthermore, the links 5 can be a wired or wireless link or any other known or later developed element(s) that is capable of supplying and communicating data to and from the connected elements. Additionally, the input devices can include, for example, a keyboard, a mouse, a speech to text converter, a stylus, a mouse, or the like. In general, the input device can be any device capable of communicating information to the document 100. Furthermore, the display device can be a computer monitor, a display on a PDA, an E-Book, or any other device capable of displaying information to one or more users.

Upon receiving a request by a user to use a document, the right availability module 120, in cooperation with the right management module 110 and the interface module 150 monitors the condition or consequential triggers associated with the document. Upon satisfaction of one or more of the conditional or consequential event, the document is released to the user for the requested use and any necessary accounting, such as crediting and/or debiting performed. Then, if the conditional or consequential right has an associated termination or expiration portion, the right availability module 120 in cooperation with the right management module 110 and the interface module 150 terminate the user's usage and/or delegation rights.

Figure 2:
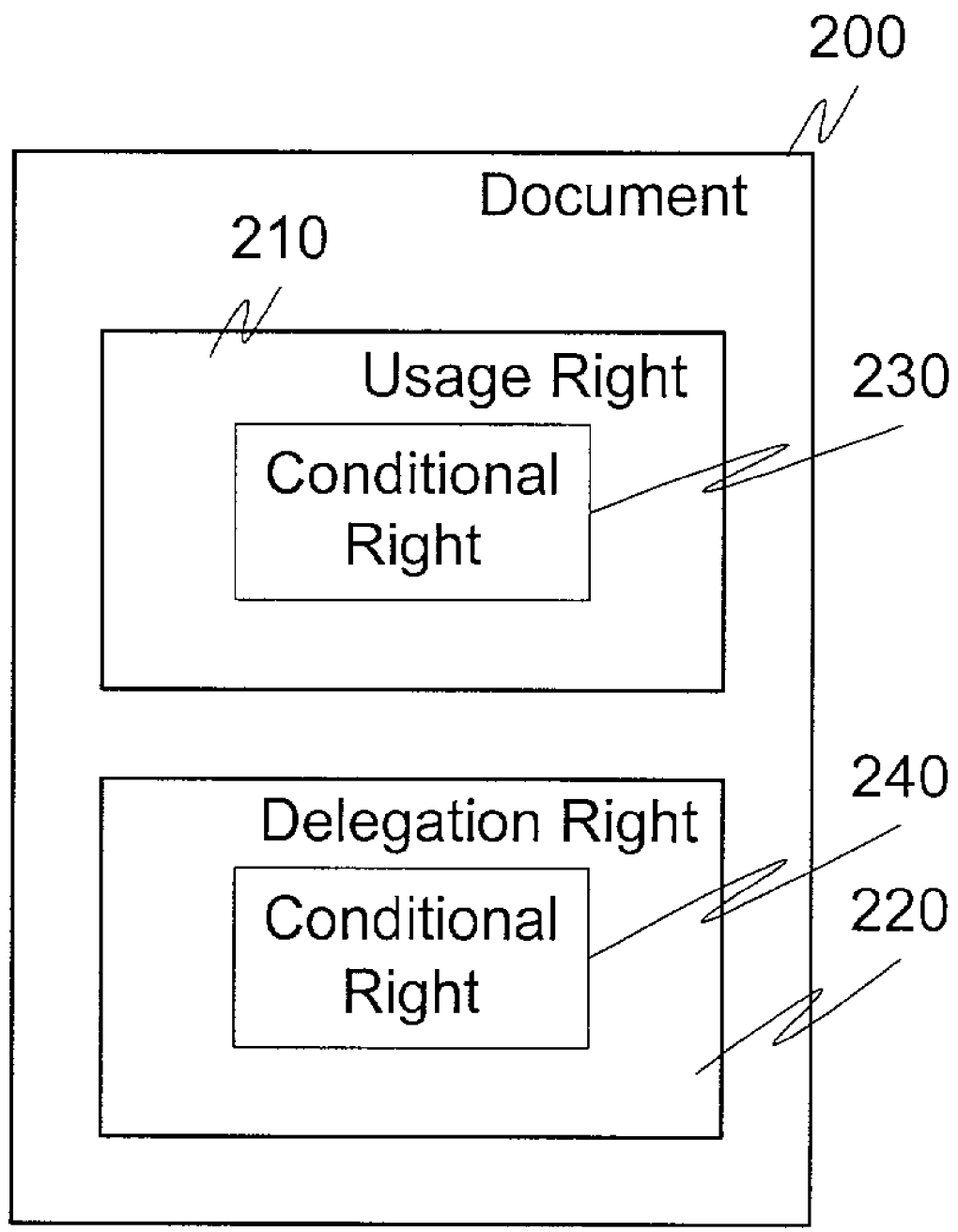
FIG. 2 illustrates an exemplary conditional or consequential right assignment according to this invention.

FIG. 2 illustrates an exemplary document 200 comprising one or more usage rights 210 and or one more delegation rights 220. Each of the usage rights 210 and the delegation rights 220 can also have associated therewith conditional/consequential rights 230 and 240, respectively. As previously discussed, this allows the usage rights to be based on, for example, the completion of a particular event or condition. Similarly, the delegation rights can be restricted based on a particular condition or event.

Figure 3:
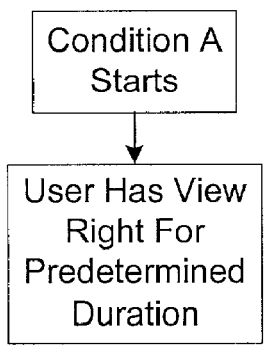
FIG. 3 illustrates an exemplary conditional or consequential right assignment according to this invention.

FIGS. 3–8 illustrate exemplary conditional events and subsequent rights granted to users. In particular, FIG. 3 illustrates that after condition A commences, a user has a view right for a predetermined duration.

Figure 4:
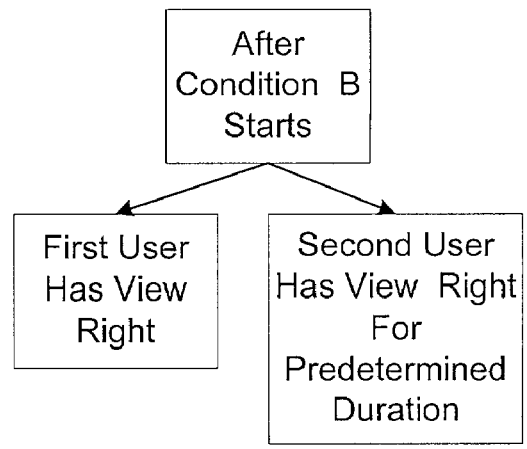
FIG. 4 illustrates an exemplary conditional or consequential right assignment according to this invention.

In FIG. 4, after a condition B starts, a first user has a view right associated with a document. Additionally, a second user has a view right that it limited to a predetermined duration.

Figure 5:
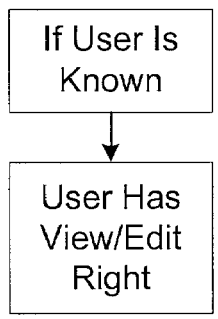
FIG. 5 illustrates an exemplary conditional or consequential right assignment according to this invention.

In FIG. 5, if an exemplary user in possession of the document is known, via, for example, a smart card, an identification, such as driver's license, a fingerprint, or the like, and the user's identity matches the conditional right, the user has view and edit rights for the document.

Figure 6:
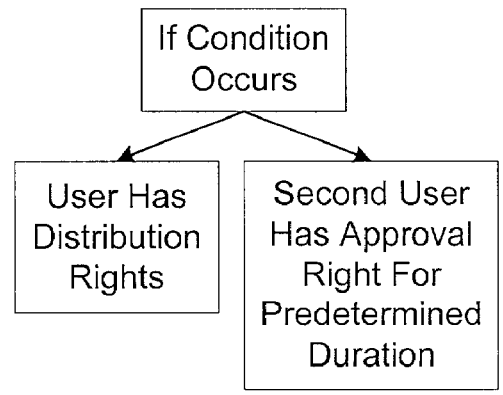
FIG. 6 illustrates an exemplary conditional or consequential right assignment according to this invention.

In FIG. 6, if an exemplary predetermined condition occurs, a first user has distribution rights, and a second user has an approval right for a predetermined duration. For example, the conditional event could be a stock offering that the first user can distribute. The second user can then be granted the option to purchase stock at, for example, a preferred price, for 24 hours. After 24 hours, this right to purchase can be withdrawn, and the second user's access to the document restricted.

Figure 7:
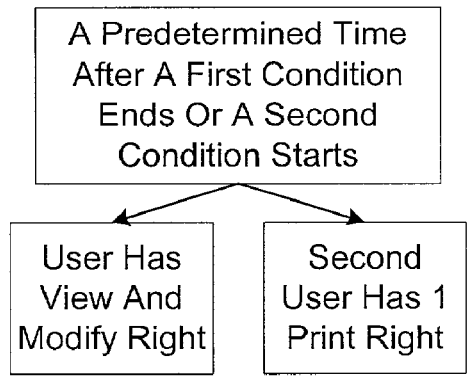
FIG. 7 illustrates an exemplary conditional or consequential right assignment according to this invention.

FIG. 7 illustrates an exemplary conditional event where a predetermined time after a first condition ends or a second condition starts, subsequent rights are available. In this exemplary embodiment, after the triggering event, a first user has view and modify rights, while a second user is granted one print right.

Figure 8:
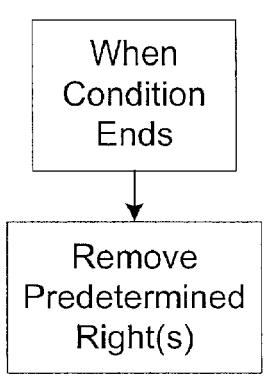
FIG. 8 illustrates an exemplary conditional or consequential right assignment according to this invention.

In FIG. 8, the triggering event is when a predetermined condition ends. Upon satisfaction of this triggering event, rights are removed from the document possessed by the user. For example, the document can monitor the current date and time and once that time has passed, restrict access to the document.

Figure 9:
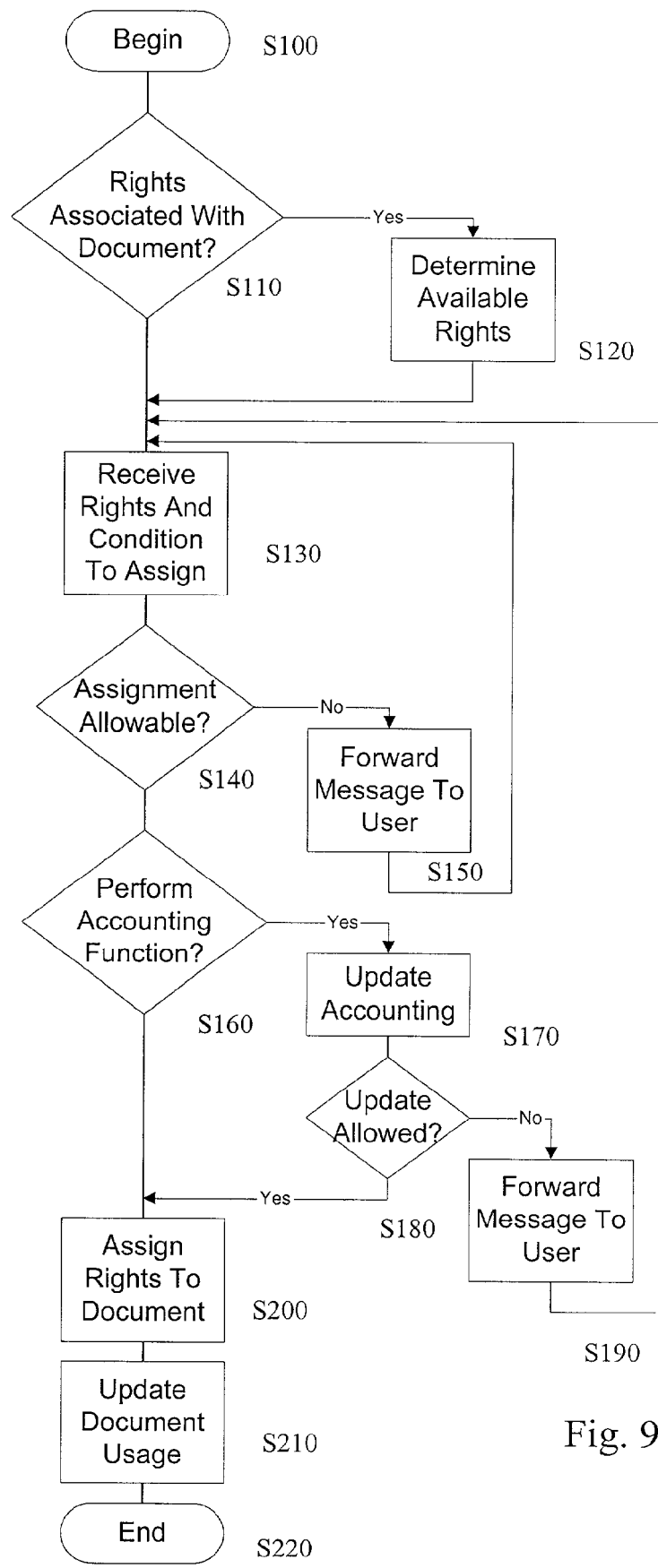
FIG. 9 is a flowchart outlining an exemplary method for assigning rights according to this invention.

FIG. 9 illustrates an exemplary embodiment of a method for associating conditional and/or consequential rights with a document. In particular, control begins in step S100 and continues to step S110. In step S110, a determination is made whether rights are already associated with the document. If rights are associated with the document, control continues to step S120 where the usage and delegation rights available to the particular user are determined. Control then continues to step S130.

In step S130, the rights one or more users desire to have associated with the document are received. Next, in step S140, it is determined whether the assignment of these rights is allowable. If the assignment is allowable, control continues to step S160. Otherwise, control jumps to step S150. In step S150, a message can be forwarded to the user indicating the assignment is not available. Control then optionally continues back to step S130.

In step S160, an optional accounting function can be performed. If accounting is necessary, control continues to step S170. Otherwise, control jumps to step S200.

In step S170, any necessary accounting functions are attempted. Then, in step S180, a determination is made whether the accounting, e.g., any crediting and/or debiting, is allowed. If the accounting functions are successful, control jumps to step S200. Otherwise, control continues to step S190 where a message can be forwarded to the user and control returns back to step S130.

In step S200, the right as chosen by the one or more users are associated with the document. Then, in step S210, the document can be updated reflecting, for example, which usage rights were used, the effect of any of these usage rights, a signature of the user and, for example, any modifications to or assignment of delegation rights. Control then continues to step S200 where the control sequence ends.

Figure 10:
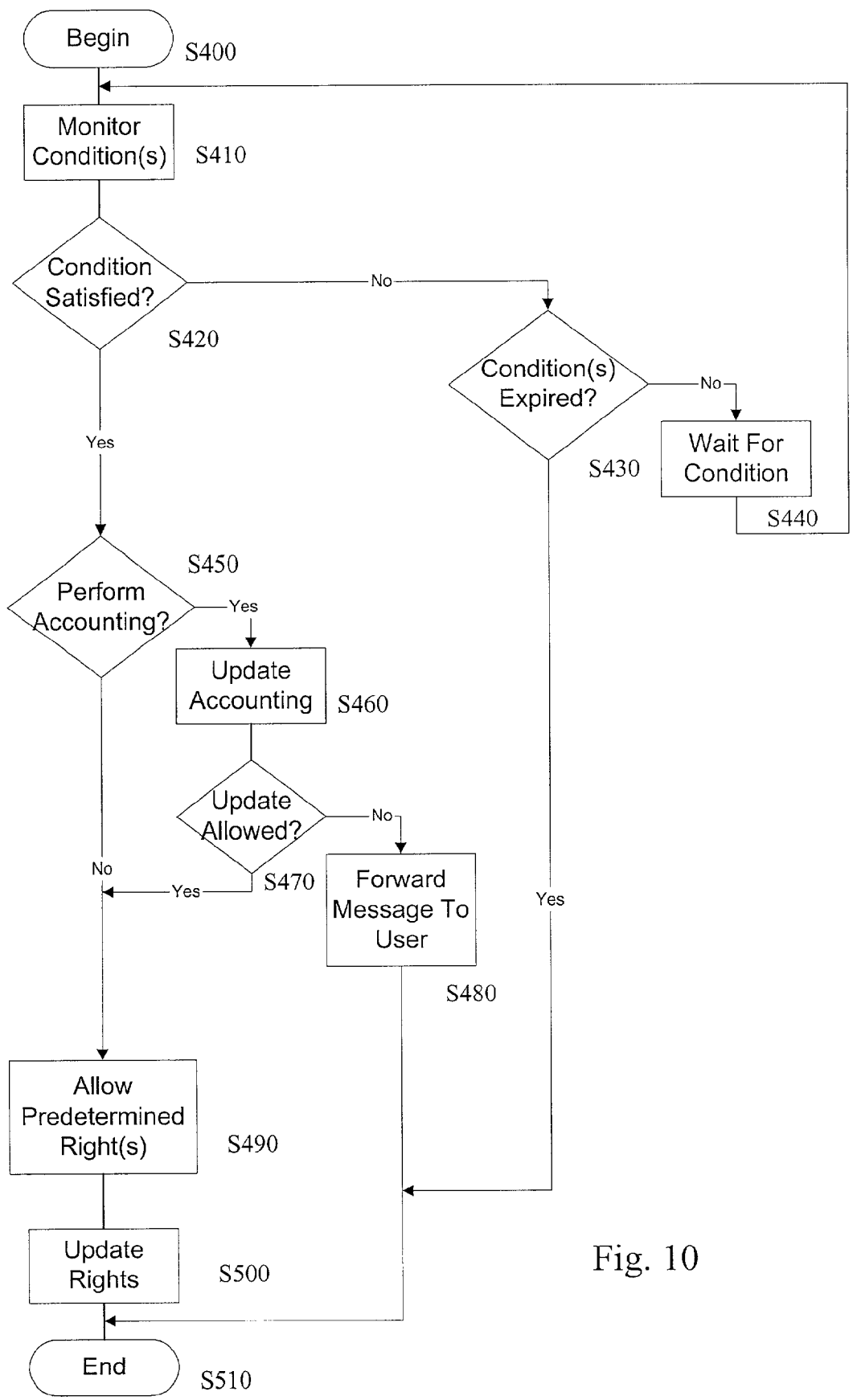
FIG. 10 is a flowchart outlining an exemplary method for exercising a right based on a condition or consequence according to this invention.

FIG. 10 illustrates an exemplary method of activating a right based, which could grant or restrict access, based on one or more conditions. In particular, control begins in step S400 and continues to step S410. In step S410, one or more conditions are monitored for detection of a triggering event. Then, in step S420, a determination is made whether the triggering event has been satisfied. If the triggering event is present, control jumps to step S450, otherwise, control continues to step S430. In step S430, a determination is made whether the conditional triggering event has expired. If the triggering event has expired, control jumps to step S510 where the control sequence ends. Otherwise, control continues to step S440, where the system waits for the triggering event and returns to step S410.

In step S450, a determination is made whether any accounting actions are necessary. If accounting actions are required, control continues to steps S460. Otherwise, control jumps to step S490.

In step S460, any necessary accounting, such as debiting and/or crediting is performed. Next, in step S470, a determination is made whether the debiting and/or crediting was successful. If the accounting was successful, control jumps to step S490, otherwise, control continues to step S480, where a message can be forwarded to the user indicating a problem associated with the accounting. Control then continues to step S510.

In step S490, one or more users are granted access to one or more documents based on the associated usage and delegation rights. Next, in step S500, the usage rights can be updated, for example, by associating a digital signature with the document that corresponds to, for example, the identify of the user and/or any modifications the user may have made to the document and any delegations performed by that user. Control then continues to step S510 where the control sequence ends.

As illustrated in FIG. 1, the document can be implemented either on a single programmed general purpose computer or a separate programmed general purpose computer. However, the document can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as a PLD, PLA, FPGA, PAL, or the like. In general, any device capable of implementing a finite state machine that is in turn capable of implementing the flowcharts in FIGS. 9–10 can be used to implement the document and conditional/consequential rights management system according to this invention.

Furthermore, the disclosed method may be readily implemented in software using object or object-oriented software development environments that provide portable source code that can be used on a variety of computer or workstation hardware platforms. Alternatively, the disclosed document and right management system may be implemented partially or fully in hardware using standard logic circuits or VLSI design. Whether hardware or software is used to implement the systems and methods in accordance with this invention is dependent on the speed and/or efficiency requirements of the system, the particular function, and a particular software and/or hardware systems or microprocessor or microcomputer systems being utilized. The document and rights management systems illustrated herein, however, can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor or the like. In these instances, the methods and systems of this invention can be implemented as a program embedded in a personal computer, an E-Book, a secure container, or the like, such as a Java® or CGI script, as an XML document, as a resource residing on a server or graphics workstation, as a routine embedded in a dedicated electronic document, an electronic document viewer, or the like. The document and rights management system can also be implemented by physically incorporating the systems and methods into a hardware and/or software system, such as the hardware and software systems of a computer or dedicated electronic document.

It is, therefore, apparent that there has been provided, in accordance with the present invention, systems and methods for managing electronic documents. While this invention has been described in conjunction with a number of embodiments, it is evident that many alternatives, modifications and variations would be or are apparent to those of ordinary skill in the applicable art. Accordingly, applicants intend to embrace all such alternatives, modifications and variations that are within the spirit and scope of this invention.

What is claimed is:

1. A rights management system for managing and enforcing rights to use digital content, the system comprising:
    at least one repository for enforcing rights associated with content;
    one or more consequential rights that are linked to another right and that are associated with respective content, and that are exercisable only upon satisfaction of a consequential event including expiration or exercise of the another right; and
    a right management module that manages the one or more consequential rights by enforcing use of the respective content based on the consequential rights, and permitting exercise of the consequential rights only after the satisfaction of the consecuential event including the expiration or exercise of the another right to thereby provide sequential access to the respective content in accordance with the another right and the consequential rights.

2. The system of claim 1, wherein the one or more consequential rights comprise one or more usage rights and one or more conditional values.

3. The system of claim 2, wherein the usage rights comprise at least one of viewing, printing, editing, approving, modifying, updating and copying.

4. The system of claim 2, wherein the conditional values comprise at least one of an absolute value and a relative value that at least one of allow access or restrict access to one or more items of digital content.

5. The system of claim 1, wherein the one or more consequential rights are associated with one or more items of digital content.

6. The system of claim 5, wherein the items of digital content comprise at least one of E-Books, books, documents, audio information, music, multimedia presentations and video information.

7. The system of claim 1, wherein the one or more consequential rights comprise a plurality of consequential rights.

8. A method of managing and enforcing rights to use digital content in a system having at least one repository for enforcing rights associated with content of the digital works, the method comprising the steps of:
    electronically determining one or more consequential rights, the consequential rights being linked to another right and associated with respective content and being exercisable only upon satisfaction of a consequential event including expiration or exercise of the another right;
    associating the one or more consequential rights with the respective content; and
    enforcing use of the respective content based on the consequential rights, and permitting exercise of the consequential rights only after the satisfaction of the consequential event including the expiration or exercise of the another right to thereby provide sequential access to the respective content in accordance with the another right and the consequential rights.

9. The method of claim 8, wherein the one or more consequential rights comprise one or more usage rights and one or more conditional values.

10. The method of claim 9, wherein the usage rights comprise at least one of viewing, printing, editing, approving, modifying, updating and copying.

11. The method of claim 9, wherein the conditional values comprise at least one of an absolute value and a relative value that at least one of allow access or restrict access to one or more items of digital content.

12. The method of claim 8, wherein the one or more consequential rights are associated with one or more portions of information.

13. The method of claim 8, wherein the digital content comprise at least one of E-Books, music, multimedia presentations and video information.

14. The method of claim 8, wherein the one or more consequential rights comprise a plurality of consequential rights.

15. A computer-readable medium storing one or more computer readable instructions for a digital rights management language for managing and enforcing rights to use digital content in a system having at least one repository for enforcing rights associated with content of the digital works, the computer readable instructions configured to cause one or more computer processors to perform the steps of:
    specifying one or more usage rights that define the manner in which content can be used;
    linking one or more consequential rights to another usage right and that are associated with respective content, the consequential rights being exercisable only upon satisfaction of a consequential event including expiration or exercise of the another usage right; and
    providing an enforcement instruction that enforces the use of the respective content based on the consequential rights, and permits exercise of the consequential rights only after the satisfaction of the consequential event including the expiration or exercise of the another usage right to thereby provide sequential access to the respective content in accordance with the another right and the consequential rights.

16. The computer-readable medium of claim 15, wherein the usage rights comprise at least one of viewing, printing, editing, approving, modifying, updating and copying.

17. The computer-readable medium of claim 15, wherein the consequential rights comprise at least one trigger that at least one of allows access or restricts access to one or more items of digital content.

18. A computer-readable medium storing one or more computer readable instructions for managing and enforcing rights to use digital content in a system having at least one repository for enforcing rights associated with content of the digital works, the computer readable instructions comprising:

an instruction that determines one or more consequential rights, the consequential rights being linked to another right and that are associated with respective content and exercisable only upon satisfaction of a consequential event including expiration or exercise of the another right;

an instruction that associates the one or more consequential rights with one or more of the respective content; and an instruction that enforces use of the respective content based on the consequential rights, and permits exercise of the consequential rights only after the satisfaction of the consequential event including the expiration or exercise of the another right to thereby provide sequential access to the respective content in accordance with the another right and the consequential rights.

19. The computer-readable medium of claim 18, wherein the one or more consequential rights comprise one or more usage rights and one or more conditional values.

20. The computer-readable medium of claim 19, wherein the usage rights comprise at least one of viewing, printing, editing, approving, modifying, updating and copying.

21. The computer-readable medium of claim 19, wherein the conditional values comprise at least one of an absolute value and a relative value that at least one of allow access or restrict access to one or more items of digital content.

22. The computer-readable medium of claim 21, wherein the absolute value is at least one of a time, a date, an identity and a location.

23. The computer-readable medium of claim 21, wherein the relative value is at least one of based on the status of one or more other usage rights, and one or more events.

24. The computer-readable medium of claim 18, wherein the digital content comprise at least one of E-Books, books, music, audio information, multimedia presentations and video information.

25. The computer-readable medium of claim 18, wherein the one or more consequential rights comprise a plurality of consequential rights.

* * * * *